US011661687B2

(12) United States Patent
Wu et al.

(10) Patent No.: US 11,661,687 B2
(45) Date of Patent: May 30, 2023

(54) THERMAL INSULATORS AND METHODS THEREOF

(71) Applicant: 3M INNOVATIVE PROPERTIES COMPANY, St. Paul, MN (US)

(72) Inventors: Pingfan Wu, Woodbury, MN (US); Tien Tsung Wu, Woodbury, MN (US); Gerry A. Hoffdahl, Scandia, MN (US); MingZhu Li, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/860,715

(22) Filed: Jul. 8, 2022

(65) Prior Publication Data

US 2022/0364280 A1 Nov. 17, 2022

Related U.S. Application Data

(63) Continuation of application No. 16/639,622, filed as application No. PCT/CN2017/110372 on Nov. 10, 2017, now abandoned.

(51) Int. Cl.
*D04H 1/4382* (2012.01)
*D04H 1/435* (2012.01)
(Continued)

(52) U.S. Cl.
CPC ........... *D04H 1/4382* (2013.01); *B29C 43/24* (2013.01); *B29C 70/08* (2013.01); *D04H 1/43* (2013.01);
(Continued)

(58) Field of Classification Search
CPC .......... H01M 8/04067; H01M 10/658; H01M 10/625; H01M 50/249;
(Continued)

(56) References Cited

U.S. PATENT DOCUMENTS 3,975,565 A 8/1976 Kendall
4,237,180 A 12/1980 Jaskowski
(Continued)

FOREIGN PATENT DOCUMENTS

DE 202016101780 U1 * 7/2016
EP 1091038 A2 4/2001
(Continued)

OTHER PUBLICATIONS

1507 Extended EP Search Report for EP17931634.4, PCT/CN2017/110372, dated May 26, 2021, 10pgs.
(Continued)

*Primary Examiner* — Jeffrey M Wollschlager
(74) *Attorney, Agent, or Firm* — Philip P. Soo (57) ABSTRACT

The provided articles and methods use a non-woven fibrous web containing 60-100 wt % of oxidized polyacrylonitrile fibers; and 0-40 wt % of reinforcing fibers having outer surfaces comprised of a polymer with a melting temperature of from 100° C. to 300° C. The non-woven fibrous web has an average bulk density of from 15 kg/m³ to 50 kg/m³, with the plurality of fibers substantially entangled along directions perpendicular to a major surface of the non-woven fibrous web. Optionally, the oxidized polyacrylonitrile fibers can have a crimped configuration. Advantageously, these articles can display a combination of low thermal conductivity, high tensile strength, and flame resistance.

16 Claims, 2 Drawing Sheets

(51) Int. Cl.

| | | |
|---|---|---|
| *B29C 43/24* | (2006.01) | |
| *D04H 1/43* | (2012.01) | |
| *H01M 10/658* | (2014.01) | |
| *B29C 70/08* | (2006.01) | |
| *D04H 1/4374* | (2012.01) | |
| *D04H 1/485* | (2012.01) | |
| *B29K 233/20* | (2006.01) | |
| *B29C 43/52* | (2006.01) | |
| *B29K 105/12* | (2006.01) | |
| *B05D 1/18* | (2006.01) | |

(52) U.S. Cl.
CPC ......... *D04H 1/435* (2013.01); *D04H 1/43835* (2020.05); *H01M 10/658* (2015.04); *B05D 1/18* (2013.01); *B29C 2043/522* (2013.01); *B29C 2043/525* (2013.01); *B29K 2105/128* (2013.01); *B29K 2233/20* (2013.01); *B32B 2250/20* (2013.01); *B32B 2262/0276* (2013.01); *B32B 2262/14* (2013.01); *D04H 1/4374* (2013.01); *D04H 1/485* (2013.01)

(58) Field of Classification Search
CPC ....... H01M 50/10–145; H01M 50/209; H01M 50/24; H01M 10/653; D04H 1/4382; D04H 1/43; D04H 1/435; D04H 1/43835; D04H 1/4374; D04H 1/485; D04H 1/55; D04H 3/105; D04H 1/46; B29C 43/24; B29C 70/08; B29C 2043/522; B29C 2043/525; B05D 1/18; B29K 2105/128; B29K 2233/20; B32B 2250/20; B32B 2262/0276; B32B 2262/14; Y02E 60/10
See application file for complete search history.

(56) References Cited

U.S. PATENT DOCUMENTS

| | | | |
|---|---|---|---|
| 4,837,076 A | 6/1989 | McCullough, Jr. et al. | |
| 4,880,168 A | 11/1989 | Randell, Jr. et al. | |
| 5,169,700 A | 12/1992 | Meier et al. | |
| 5,278,002 A * | 1/1994 | Hiers | H01M 50/24 |
| | | | 429/177 |
| 6,092,622 A | 7/2000 | Hiers et al. | |
| 6,808,664 B2 | 10/2004 | Falk et al. | |
| 7,147,734 B2 | 12/2006 | Ogle et al. | |
| 7,259,117 B2 | 8/2007 | Mater et al. | |
| 7,491,354 B2 | 2/2009 | Anderson | |
| 9,194,065 B2 | 11/2015 | Moore et al. | |
| 2005/0129845 A1* | 6/2005 | Dadalas | E04D 7/005 |
| | | | 427/180 |
| 2006/0040580 A1* | 2/2006 | Ogle | D04H 1/43828 |
| | | | 442/389 |
| 2006/0141918 A1 | 6/2006 | Reinke | |
| 2006/0160454 A1 | 7/2006 | Handermann et al. | |
| 2008/0311392 A1 | 12/2008 | Tsu | |
| 2009/0191407 A1* | 7/2009 | Lewarchik | H01B 1/22 |
| | | | 252/514 |
| 2011/0111163 A1 | 5/2011 | Bozouklian et al. | |
| 2011/0159341 A1* | 6/2011 | Iwamoto | H01M 10/613 |
| | | | 429/120 |
| 2013/0236773 A1* | 9/2013 | Nagata | H01M 50/116 |
| | | | 429/179 |
| 2014/0024279 A1 | 1/2014 | Berrigan et al. | |
| 2015/0000117 A1* | 1/2015 | Cho | B29C 66/73921 |
| | | | 29/730 |
| 2015/0151510 A1 | 6/2015 | Handermann et al. | |
| 2015/0233030 A1 | 8/2015 | Iiba et al. | |
| 2017/0182736 A1 | 6/2017 | Bergner et al. | |
| 2018/0144734 A1 | 5/2018 | Wang et al. | |
| 2019/0119847 A1 | 4/2019 | Brabbs et al. | |
| 2019/0140327 A1* | 5/2019 | Fukada | H01M 10/617 |

FOREIGN PATENT DOCUMENTS

| | | |
|---|---|---|
| EP | 2918450 A1 | 1/2019 |
| JP | 2002302861 A | 10/2002 |
| JP | 2002333092 A | 11/2002 |
| JP | 2005246952 A | 9/2005 |
| WO | 198802695 A1 | 4/1988 |
| WO | 198903764 A1 | 5/1989 |
| WO | 199407279 A1 | 3/1994 |
| WO | 199506449 A1 | 3/1995 |
| WO | 2017084721 A1 | 5/2017 |
| WO | 2019018508 A1 | 1/2019 |

OTHER PUBLICATIONS

International Search report for PCT International Application No. PCT/CN2017/110372 dated Jul. 17, 2018, 5 pages.

* cited by examiner

THERMAL INSULATORS AND METHODS THEREOF

CROSS REFERENCE TO RELATED APPLICATIONS

This application is a continuation application of pending prior application Ser. No. 16/639,622, filed Feb. 17, 2020, which is a US national stage filing under 35 U.S.C. 371 of PCT/CN2017/110372 filed Nov. 10, 2017, the disclosures of which are incorporated by reference in entirety herein.

FIELD OF THE INVENTION

Provided are articles for use in thermal insulation. The provided articles may be used as thermal insulators in automotive and aerospace applications such as battery compartments for electric vehicles.

BACKGROUND

Thermal insulators reduce heat transfer between structures either in thermal contact with each other or within range of thermal convection or radiation. These materials mitigate the effects of conduction, convection, and/or radiation, and can thus help in stabilizing the temperature of a structure in proximity to another structure at significantly higher or lower temperature. By preventing overheating of a component or avoiding heat loss where high temperatures are desired, thermal management can be critical in achieving the function and performance demanded in widespread commercial and industrial applications.

Thermal insulators can be particularly useful in the automotive and aerospace areas. For example, internal combustion engines of automobiles produce a great deal of heat during their combustion cycle. In other areas of the vehicle, thermal insulation is used to protect electronic components sensitive to heat. Such components can include, for example, sensors, batteries, and electrical motors. To maximize fuel economy, it is desirable for thermal insulation solutions to be as thin and lightweight as possible while adequately protecting these components. Ideally, these materials are durable enough to last the lifetime of the vehicle.

The demand for suitable insulating materials has intensified with the advent of electric vehicles ("EVs"). EVs employ many lithium ion batteries that perform optimally within a defined temperature range, more particularly around ambient temperatures. EVs generally have a battery management system that activates an electrical heater if the battery temperature drops significantly below optimal temperatures and activates a cooling system when the battery temperature creeps significantly higher than optimal temperatures.

SUMMARY

Operations used for heating and cooling EV batteries can substantially deplete battery power that would otherwise have been directed to the vehicle drivetrain. During winter months, temperatures might dip as low as −30° C., while road temperatures in summer months can exceed 65° C. Just as a blanket provides comfort by conserving a person's body heat in cold weather, thermal insulation passively minimizes the power required to protect the EV batteries in extreme temperatures.

Developers of insulation materials for EV battery applications face formidable technical challenges. For instance, EV battery insulation materials should display low thermal conductivity while satisfying strict flame retardant requirements to extinguish or slow the spread of a battery fire. A common test for flame retardancy is the UL-94V0 flame test. It is also desirable for a suitable thermal insulator to resiliently flex and compress such that it can be easily inserted into irregularly shaped enclosures and expand to occupy fully the space around it. Finally, these materials should display sufficient mechanical strength and tear resistance to facilitate handling and installation in a manufacturing process.

The provided articles and methods address these problems using an entangled non-woven fibrous web containing thermally-insulating fibers including oxidized polyacrylonitrile fibers and, optionally, one or more reinforcing fibers. The fibers are entangled in directions perpendicular to the major surface of the non-woven fibrous web to impart strength to the material and prevent swelling upon exposure to flame treatment. The reinforcing fibers can at least partially melt when heated to form a bonded web with enhanced strength. Optionally, one or both sets of fibers have a crimped configuration to provide greater web thickness and reduce bulk density.

In a first aspect, a thermal insulator is provided. The thermal insulator comprises: a non-woven fibrous web comprising a plurality of fibers, the plurality of fibers comprising: 60-100 wt % of oxidized polyacrylonitrile fibers; and 0-40 wt % of reinforcing fibers having an outer surface comprised of a polymer with a melting temperature of from 100° C. to 300° C., wherein the non-woven fibrous web has an average bulk density of from 15 kg/m$^3$ to 50 kg/m$^3$ and wherein the plurality of fibers are substantially entangled along directions perpendicular to a major surface of the non-woven fibrous web.

In a second aspect, a thermally insulated assembly is provided, comprising: a heat source; and an aforementioned thermal insulator at least partially surrounding the heat source.

In a third aspect, a method of making a thermal insulator is provided, comprising: mixing oxidized polyacrylonitrile fibers having crimped configurations with reinforcing fibers having outer surfaces comprised of a polymer with a melting temperature between 100° C. and 300° C.; heating the fiber mixture to a temperature sufficient to melt the outer surfaces of the reinforcing fibers to provide a non-woven fibrous web; and entangling the oxidized polyacrylonitrile fibers and reinforcing fibers with each other along a direction perpendicular to the non-woven fibrous web to provide an average bulk density of from 10 kg/m$^3$ to 35 kg/m$^3$ in the non-woven fibrous web.

In a fourth aspect, a method of making a thermal insulator is provided, comprising: mixing oxidized polyacrylonitrile fibers with reinforcing fibers having outer surfaces comprised of a polymer with a melting temperature between 100° C. and 300° C. to obtain a non-woven fibrous web, wherein the oxidized polyacrylonitrile fibers represent over 85% by volume of fibers present that are not reinforcing fibers; heating the fiber mixture to a temperature sufficient to melt the outer surfaces of the reinforcing fibers to provide a non-woven fibrous web; and entangling the oxidized polyacrylonitrile fibers and reinforcing fibers with each other along a direction perpendicular to the non-woven fibrous web to provide an average bulk density of from 10 kg/m$^3$ to 50 kg/m$^3$ in the non-woven fibrous web.

In a fifth aspect, a method of insulating an electric vehicle battery is provided, comprising: providing an enclosure adjacent to the electric vehicle battery; placing an aforementioned thermal insulator in compression within the enclosure; and allowing the thermal insulation to expand and substantially fill the enclosure.

BRIEF DESCRIPTION OF THE DRAWINGS

As provided herein.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. Drawings may not be to scale.

DEFINITIONS

As used herein:

"Ambient conditions" means at 25° C. and 101.3 kPa pressure.

"Average" means number average, unless otherwise specified.

"Copolymer" refers to polymers made from repeat units of two or more different polymers and includes random, block and star (e.g. dendritic) copolymers.

"Median fiber diameter" of fibers in a non-woven fibrous web is determined by producing one or more images of the fiber structure, such as by using a scanning electron microscope; measuring the transverse dimension of clearly visible fibers in the one or more images resulting in a total number of fiber diameters; and calculating the median fiber diameter based on that total number of fiber diameters.

"Non-woven fibrous web" means a plurality of fibers characterized by entanglement or point bonding of the fibers to form a sheet or mat exhibiting a structure of individual fibers or filaments which are interlaid, but not in an identifiable manner as in a knitted fabric.

"Polymer" means a relatively high molecular weight material having a molecular weight of at least 10,000 g/mol.

"Size" refers to the longest dimension of a given object or surface.

"Substantially" means to a significant degree, as in an amount of at least 30%, 40, 50, 60, 70, 80, 90, 95, 96, 97, 98, 99, 99.5, 99.9, 99.99, or 99.999%, or 100%.

"Thickness" means the distance between opposing sides of a layer or multilayered article.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular drawing. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Where applicable, trade designations are set out in all uppercase letters.

Figure 1:
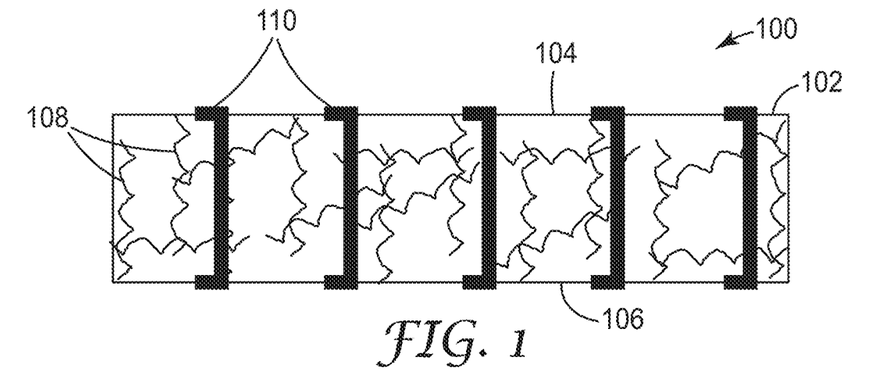
FIGS. 1-4 are side cross-sectional views of thermal insulators according to various exemplary embodiments.

A thermal insulator according to one embodiment of the invention is illustrated in FIG. 1 and hereinafter referred to by the numeral 100. The thermal insulator 100 includes a non-woven fibrous web 102 having opposed first and second major surfaces 104, 106.

The non-woven fibrous web 102 is comprised of a plurality of fibers, including oxidized polyacrylonitrile fibers 108. Oxidized polyacrylonitrile fibers 108 include those available under the trade designations PYRON (Zoltek Corporation, Bridgeton, Mo.) and PANOX (SGL Group, Meitingen, GERMANY).

The oxidized polyacrylonitrile fibers 100 are derived from a polymeric precursor that contains acrylonitrile and one or more co-monomers. Useful co-monomers include, for example, methyl methacrylate, methyl acrylate, vinyl acetate, and vinyl chloride. The co-monomer(s) may be present in an amount of up to 15 wt %, 14 wt %, 13 wt %, 12 wt %, 11 wt %, 10 wt %, 9 wt %, or 8 wt %, relative to the overall weight of the polymeric precursor.

Oxidation of the precursor fibers can be achieved by first stabilizing the precursor fibers at high temperatures to prevent melting or fusion of the fibers, carbonizing the stabilized fibers to eliminate the non-carbon elements and finally a graphitizing treatment at even higher temperatures to enhance the mechanical properties of the non-woven fibers. The oxidized polyacrylonitrile fibers 100 may be partially or fully oxidized.

Stabilization can be carried out by controlled heating of the precursor fiber in air or some other oxidizing atmosphere. Oxidation typically takes place at temperatures in the range of from 180° C. to 300° C., with a heating rate of from 1-2° C. per minute.

If desired, shrinkage of the precursor fibers can be minimized by stretching the fibers along their axis during the low-temperature stabilization treatment. Stretching can produce oxidized polyacrylonitrile fibers with a high degree of preferred orientation along the fiber axis. The stabilization process produces changes in chemical structure of the acrylic precursor whereby the material becomes thermally stable to subsequent high temperature treatments. During this process, the fibers change in color to black. The black fibers are carbonized in an inert atmosphere at high temperatures, typically from 1000° C. to 1500° C., at a slow heating rate to avoid damage to the molecular order of the fiber. The fibers are given a graphitizing treatment at high temperatures for example, above 2000° C. to 3000° C. to improve the texture of the fiber and to enhance the tensile modulus of the non-woven fibrous web 102. If desired, the strength and the tensile modulus of the fibers can be further improved by stretching at elevated temperatures.

The oxidized polyacrylonitrile fibers 108 preferably have a fiber diameter and length that enables fiber entanglements within the non-woven fibrous web. The fibers, however, are preferably not so thin that web strength is unduly compromised. The fibers 108 can have a median fiber diameter of from 1 micrometers to 100 micrometers, from 2 micrometers to 50 micrometers, from 5 micrometers to 20 micrometers, or in some embodiments, less than, equal to, or greater than 1 micrometer, 2, 3, 5, 7, 10, 15, 20, 25, 30, 40, 50, 60, 70, 80, 90, or 100 micrometers.

Inclusion of long fibers can reduce fiber shedding and further enhance strength of the non-woven fibrous web along transverse directions. The oxidized polyacrylonitrile fibers 108 can have a median fiber length of from 10 millimeters to 100 millimeters, from 15 millimeters to 100 millimeters, from 25 millimeters to 75 millimeters, or in some embodiments, less than, equal to, or greater than 10 millimeters, 12, 15, 17, 20, 25, 30, 35, 40, 45, 50, 55, 60, 65, 70, or 75 millimeters.

The oxidized polyacrylonitrile fibers 108 used to form the non-woven fibrous web 102 can be prepared from hulk fibers. The bulk fibers can be placed on the inlet conveyor belt of an opening/mixing machine in which they can be teased apart and mixed by rotating combs. The fibers are then blown into web-forming equipment where they are formed into a dry-laid non-woven fibrous web.

As an alternative, a SPIKE air-laying forming apparatus (commercially available from FormFiber NV, Denmark) can be used to prepare nonwoven fibrous webs containing these bulk fibers. Details of the SPIKE apparatus and methods of using the SPIKE apparatus in forming air-laid webs is described in U.S. Pat. No. 7,491,354 (Andersen) and U.S. Pat. No. 6,808,664 (Falk et al.).

Bulk fibers can be fed into a split pre-opening and blending chamber with two rotating spike rollers with a conveyor belt. Thereafter, the bulk fibers are fed into the top of the forming chamber with a blower. The fibrous materials can be opened and fluffed in the top of the chamber and then fell through the upper rows of spikes rollers to the bottom of the forming chamber passing thereby the lower rows of spike rollers. The materials can then be pulled down on a porous endless belt/wire by a combination of gravity and vacuum applied to the forming chamber from the lower end of the porous forming belt/wire.

Alternatively, the non-woven fibrous web 102 can be formed in an air-laid machine. The web-forming equipment may, for example, be a RANDO-WEBBER device commercially-available from Rando Machine Co., Macedon, N.Y. Alternatively, the web-forming equipment could be one that produces a dry-laid web by carding and cross-lapping, rather than by air-laying. The cross-lapping can be horizontal (for example, using a PROFILE SERIES cross-lapper commercially-available from ASSELIN-THIBEAU of Elbeuf sur Seine, 76504 France) or vertical (for example, using the STRUTO system from the University of Liberec, Czech Republic or the WAVE-MAKER system from Santex AG of Switzerland).

The non-woven fibrous web 102 includes entangled regions 110 fully or partially extending between the first major surface 104 and the second major surface 106. The entangled regions 110 represent places where two or more discrete fibers 108 have become twisted together. The fibers within these entangled regions 110, although not physically attached, are so intertwined that they resist separation when pulled in opposing directions. With the presence of the entangled regions 110, the plurality of fibers in the non-woven fibrous web 102 are substantially entangled along directions perpendicular to the first and second major surfaces 104, 106.

In some embodiments, the entanglements are induced by a needle tacking process or hydroentangling process. Each of these processes are described in more detail below.

The non-woven fibrous web can be needle tacked using a conventional needle tacking apparatus (e.g., a needle tacker commercially available under the trade designation DILO from Dilo of Germany, with barbed needles (commercially available, for example, from Foster Needle Company, Inc., of Manitowoc, Wis.) whereby the substantially entangled fibers described above are needle tacked fibers. Needle tacking, also referred to as needle punching, entangles the fibers perpendicular to the major surface of the non-woven fibrous web by repeatedly passing an array of barbed needles through the web and retracting them while pulling along fibers of the web.

The needle tacking process parameters, which include the type(s) of needles used, penetration depth, and stroke speed, are not particularly restricted. Further, the optimum number of needle tacks per area of mat will vary depending on the application. Typically, the non-woven fibrous web is needle tacked to provide an average of at least 5 needle tacks/cm$^2$. Preferably, the mat is needle tacked to provide an average of about 5 to 60 needle tacks/cm$^2$, more preferably, an average of about 10 to about 20 needle tacks/cm$^2$.

Further options and advantages associated with needle tacking are described elsewhere, for example in U.S. Patent Publication Nos. 2006/0141918 (Rienke) and 2011/0111163 (Bozouklian et al.).

The non-woven fibrous web can be hydroentangled using a conventional water entangling unit (commercially available from Honeycomb Systems Inc. of Bidderford, Me.; also see U.S. Pat. No. 4,880,168 (Randall, Jr.), the disclosure of which is incorporated herein by reference for its teaching of fiber entanglement). Although the preferred liquid to use with the hydroentangler is water, other suitable liquids may be used with or in place of the water.

In a water entanglement process, a pressurized liquid such as water is delivered in a curtain-like array onto a non-woven fibrous web, which passes beneath the liquid streams. The mat or web is supported by a wire screen, which acts as a conveyor belt. The mat feeds into the entangling unit on the wire screen conveyor beneath the jet orifices. The wire screen is selected depending upon the final desired appearance of the entangled mat. A coarse screen can produce a mat having perforations corresponding to the holes in the screen, while a very fine screen (e.g., 100 mesh) can produce a mat without the noticeable perforations.

Figure 2:
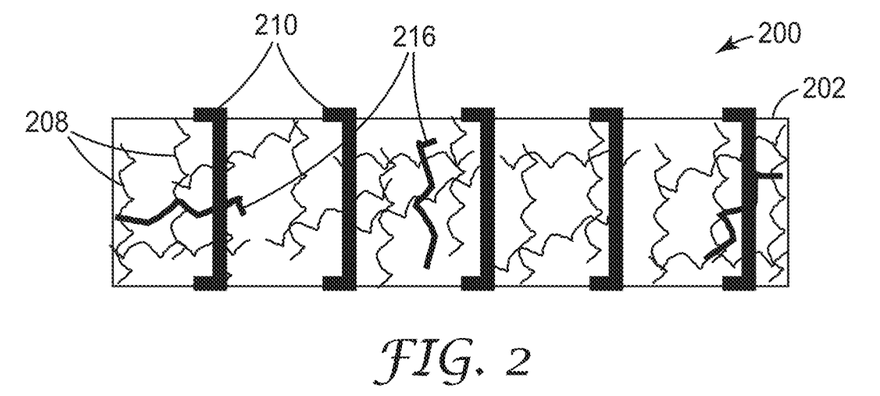

FIG. 2 shows a thermal insulator 200 which, like insulator 100, has a non-woven fibrous web 202 with opposed first and second major surfaces 204, 206. The web 202 differs from that or the prior example in that it includes both a plurality of oxidized polyacrylonitrile fibers 208 and a plurality of reinforcing fibers 216.

The reinforcing fibers 216 may include binder fibers, which have a sufficiently low melting temperature to allow subsequent melt processing of the non-woven fibrous web 202. Binder fibers are generally polymeric, and may have uniform composition or contain two or more components. In some embodiments, the binder fibers are bi-component fibers comprised of a core polymer that extends along the axis of the fibers and is surrounded by a cylindrical shell polymer. The shell polymer can have a melting temperature less than that of the core polymer.

As used herein, however, "melting" refers to a gradual transformation of the fibers or, in the case of a bi-component shell/core fiber, an outer surface of the fiber, at elevated temperatures at which the polyester becomes sufficiently soft and tacky to bond to other fibers with which it comes into contact, including oxidized polyacrylonitrile fibers and any other binder fibers having its same characteristics and, as described above, which may have a higher or lower melting temperature.

Certain thermoplastic materials such as polyester can become tacky when melted, making them suitable materials for the outer surface of a binder fiber. Useful binder fibers have outer surfaces comprised of a polymer having a melting temperature of from 100° C. to 300° C. or in some embodiments, less than, equal to, or greater than, 100° C. 105, 110, 115, 120, 125, 130, 135, 140, 145, 150, 160, 170, 180, 190, 200, 210, 220, 230, 240, 250, 260, 270, 280, 290, or 300° C.

Exemplary binder fibers include, for example, KoSa Type 254 CELBOND which is a bi-component fiber with a polyester core and a copolyester sheath. The sheath component melting temperature is approximately 230° F. (110° C.). The binder fibers can also be a polyester homopolymer or copolymer rather than a bi-component fiber.

The binder fibers increase structural integrity in the insulator 200 by creating a three-dimensional array of nodes where constituent fibers are physically attached to each other. These nodes provide a macroscopic fiber network, which increases tear strength, tensile modulus, preserves dimensional stability of the end product, and minimizes fiber shedding. Advantageously, incorporation of hinder fibers can allow bulk density to be reduced while preserving structural integrity of the non-woven fibrous web, which in turn decreases both weight and thermal conductivity.

It was found that thermal conductivity coefficient κ for the non-woven fibrous webs 102, 202 can be strongly dependent on its average bulk density. When the average bulk density of the non-woven fibrous web is significantly higher than 50 kg/m$^3$, for example, a significant amount of heat can be transmitted through the insulator by thermal conduction through the fibers themselves. When the average bulk density is significantly below 15 kg/m$^3$, heat conduction through the fibers is small but convective heat transfer can become significant. Further reduction of average bulk density can also significantly degrade strength of the non-woven fibrous web, which is not desirable.

In exemplary embodiments, the non-woven fibrous web 102, 202 has an average bulk density of from 15 kg/m$^3$ to 50 kg/m$^3$, 15 kg/m$^3$ to 40 kg/m$^3$, 20 kg/m$^3$ to 30 kg/m$^3$, or in some embodiments less than, equal to, or greater than 15 kg/m$^3$, 16, 17, 18, 19, 20, 22, 24, 25, 26, 28, 30, 32, 35, 37, 40, 42, 45, 47, or 50 kg/m$^3$.

By so reducing the overall effects of thermal conduction and convection, it is possible to achieve surprisingly low thermal conductivity coefficients. The non-woven fibrous web of the provided thermal insulators can display a thermal conductivity coefficient of less than 0.035 W/K–m, less than 0.033 W/K–m, less than 0.032 W/K–m, or in some embodiments, less than, equal to, or greater than 0.031 W/K–m, 0.032, 0.033, 0.034, or 0.035 W/K–m, at ambient conditions according to ASTM D1518-85 (re-approved 2003). Thermal conductivity coefficients in these ranges can be obtained with the non-woven fibrous web in its relaxed configuration (i.e., uncompressed) or compressed to 20% of its original thickness based on ASTM D5736-95 (re-approved 2001).

The oxidized polyacrylonitrile fibers 208 in the non-woven fibrous web 202 are not combustible. Surprisingly, it was found that combustion of the reinforcing fibers in the FAR 25-856a flame test did not result in significant dimensional changes (no shrinkage and no expansion) in the thermal insulator. This benefit appears to have been the effect of the fiber entanglements perpendicular to the major surface of the non-woven fibrous web.

The oxidized polyacrylonitrile fibers 208 can be present in any amount sufficient to provide adequate flame retardancy and insulating properties to the insulator 200. The oxidized polyacrylonitrile fibers 208 can be present in an amount of from 60 wt % to 100 wt %, 70 wt % to 100 wt %, 81 wt % to 100 wt %, or in some embodiments, less than, equal to, or greater than 50 wt %, 55, 60, 65, 70, 75, 80, 85, 90, or 95 wt %, or less than or equal to 100 wt %. The reinforcing fibers 216 can be present in an amount of from 0 wt % to 40 wt %, 3 wt % to 30 wt %, 3 wt % to 19 wt %, or in some embodiments, equal to or greater than 0 wt %, or less than, equal to, or greater than 1 wt %, 2, 3, 4, 5, 7, 10, 15, 20, 25, 30, 35, 40, 45, or 50 wt %.

Preferred weight ratios of the oxidized polyacrylonitrile fibers 208 to reinforcing fibers 216 bestow both high tensile strength to tear resistance to the insulator 200 as well as acceptable flame retardancy—for instance, the ability to pass the UL-94V0 flame test. The weight ratio of oxidized polyacrylonitrile fibers to reinforcing fibers can be at least 4:1, at least 5:1, at least 10:1, or in some embodiments, less than, equal to, or greater than 4:1, 5:1, 6:1, 7:1, 8:1, 9:1, or 10:1.

As a further option, it is possible that the non-woven fibrous web 102, 202 includes a plurality of fibers that are neither oxidized polyacrylonitrile fibers nor reinforcing fibers having an outer surface comprised of a polymer with a melting temperature of from 100° C. to 300° C. Such fibers may include, for example, polyester fibers having a melting temperature exceeding 300° C. To maximize the flame retardancy of the insulator 100, 200, however, it is preferred that the oxidized polyacrylonitrile fibers represent over 85 vol %, over 90 vol %, or over 95 vol % of the plurality of fibers that do not have an outer surface comprised of a polymer with a melting temperature of from 100° C. to 300° C.

Optionally and as shown in the figures, the oxidized polyacrylonitrile fibers 108, 208 and reinforcing fibers 116, 216 are each crimped to provide a crimped configuration (e.g., a zigzag, sinusoidal, or helical shape). Alternatively, some or all of the oxidized polyacrylonitrile fibers 108, 208 and reinforcing fibers 116, 216 have a linear configuration. The fraction of oxidized polyacrylonitrile fibers 108, 208 and/or reinforcing fibers 116, 216 that are crimped can be less than, equal to, or greater than 5%, 10, 15, 20, 25, 30, 40, 50, 60, 70, 80, 90, or 100%. Crimping, which is described in more detail in European Patent No. 0 714 248, can significantly increase the bulk, or volume per unit weight, of the non-woven fibrous web.

Figure 3:
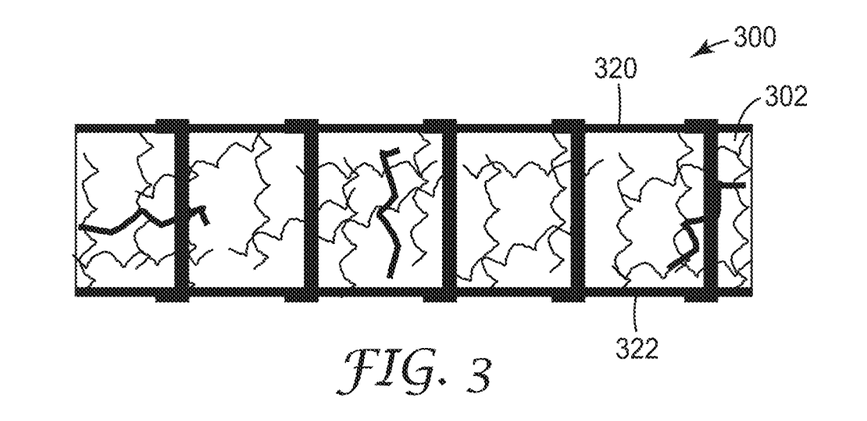

FIG. 3 is directed to a thermal insulator 300 having the same features of insulators 100, 200 while further including smoothed surfaces 320, 322 exposed on the first and second major surfaces of the insulator 300. The smoothed surfaces 320, 322 may be obtained by any known method. For example, smoothing could be achieved by calendaring the non-woven fibrous web, heating the non-woven fibrous web, and/or applying tension to the non-woven fibrous web. In some embodiments, the smoothed surfaces 320, 322 are skin layers produced by partial melting of the fibers at the exposed surfaces of the non-woven fibrous web.

In some embodiments, there may be a density gradient at the smoothed surface 320, 322. For example, portions of the smoothed surface proximate to the exposed major surface may have a density greater than portions remote from the exposed major surface. Increasing bulk density at one or both of the smoothed surfaces 320, 322 can further enhance tensile strength and tear resistance of the non-woven fibrous web. The smoothing of the surface can also reduce the extent of fiber shedding which would otherwise occur in handling or transporting the insulator 300. Still another benefit is the reduction in thermal convection by impeding the passage of air, and therefore thermal convection, through the non-woven fibrous web. The one or both smoothed surfaces 320, 322 may, in some embodiments, be non-porous such that air is prevented from flowing through the non-woven fibrous web.

Figure 4:
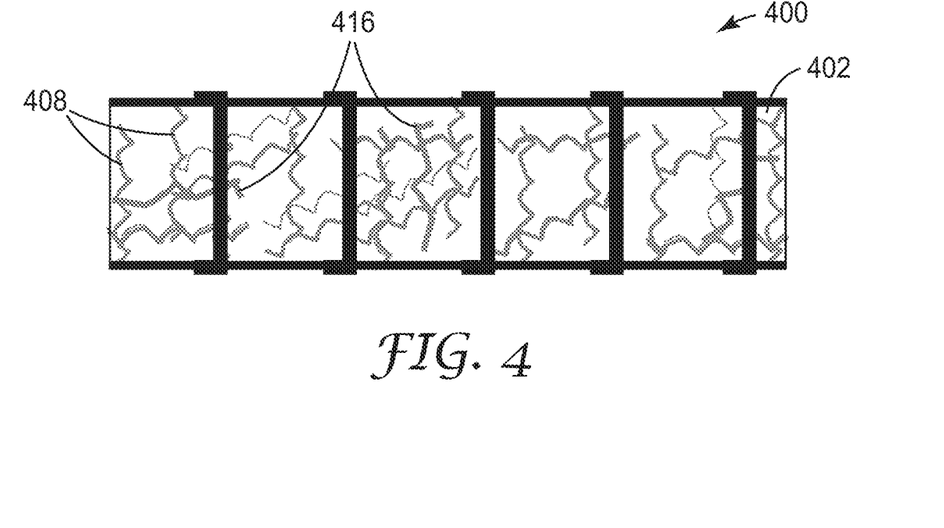

FIG. 4 shows still another thermal insulator 400 with a non-woven fibrous web 402 is comprised of a plurality of fibers, including oxidized polyacrylonitrile fibers 408 and reinforcing fibers 416. As indicated by the color contrast in FIG. 4, the oxidized polyacrylonitrile fibers 408 and reinforcing fibers 416 are coated. The coating on the fibers can selected from, for example, silicones, acrylates, and fluoropolymers whereby the non-woven fibrous web has an emissivity of less than 0.5. Here, "emissivity" is defined as the ratio of the energy radiated from a material's surface to that radiated from a blackbody (a perfect emitter) at the same temperature and wavelength and under the same viewing conditions. Reducing emissivity helps lower the extent to which a material loses heat from thermal radiation.

Coating the constituent fibers of the non-woven fibrous web 402 can impart various functional and/or aesthetic benefits. For example, coating the fibers has the effect of reinforcing the fibers, thus increasing the overall strength of the web. Certain coating materials, such as fluoropolymers and silicones, may enhance resistance to staining or fouling because of airborne substances becoming adhered to fiber surfaces. In some applications it can be desirable to sheath the fibers in an opaque coating, can also be used to change the color of the non-woven fibrous web 402, which is typically black or grey because of the oxidized polyacrylonitrile fibers.

Other aspects of the insulators 200, 300, 400 are analogous to those described already with respect to insulator 100 and shall not be repeated here.

The non-woven fibrous webs of the thermal insulators described with respect to FIGS. 1-4 can have any suitable thickness based on the space allocated for the application at hand. For common applications, the non-woven fibrous webs can have a thickness of from 1 millimeter to 50 millimeters, from 2 millimeters to 25 millimeters, from 3 millimeters to 20 millimeters, or in some embodiments, less than, equal to, or greater than 1 millimeter, 2, 3, 4, 5, 6, 7, 8, 9, 10, 12, 15, 17, 20, 22, 25, 27, 30, 35, 40, 45, or 50 millimeters.

As described previously, many factors influence the mechanical properties displayed by the non-woven fibrous web, including fiber dimensions, the presence of binding sites on the reinforcing fibers, fiber entanglements, and overall bulk density. Tensile strength and tensile modulus are metrics by which the properties of the non-woven fibrous web may be characterized.

The tensile modulus is generally indicative of the stiffness of the material and can be from 7 kPa to 1400 kPa, 70 kPa to 550 kPa, 140 kPa to 350 kPa, or in some embodiments, less than, equal to, or greater than 5 kPa, 7, 10, 15, 20, 25, 30, 40, 50, 60, 70, 80, 90, 100, 120, 140, 150, 200, 250, 300, 350, 400, 450, 500, 550, 600, 700, 800, 900, 1000, 1100, 1200, 1300, or 1400 kPa. Tensile strength represents the resistance of the non-woven fibrous web to tearing or permanently distorting and can be at least 28 kPa, at least 32 kPa, at least 35 kPa, or in some embodiments, less than, equal to, or greater than 28 kPa, 29, 30, 31, 32, 33, 34, 35, 36, 37, 38, 39, 40, 42, 44, 45, 47, or 50 kPa.

Surprisingly, it was found that entangling the fibers of the non-woven fibrous web perpendicular to the major surfaces of the web to produce a material having a bulk density in the range of from 15 kg/m$^3$ to 50 kg/m$^3$ solved a technical problem associated with volumetric expansion in the UL-94V0 or FAR 25-856a flame test. Specifically, it was discovered that while conventional oxidized polyacrylonitrile materials were observed to swell substantially after flame testing, the provided thermal insulators do not. In some embodiments, the provided non-woven fibrous webs deviates less than 10%, less than 7%, less than 5%, less than 4%, or less than 3%, or in some embodiments, less than, equal to, or greater than 10%, 9, 8, 7, 6, 5, 4, or 3% in thickness after flame testing, relative to its original dimensions.

The thermal insulators 100, 200, 300, 400 may optionally include additional layers not explicitly shown in FIGS. 1-4. To assist in installation, for example, any of these exemplary thermal insulators may further include an adhesive layer, such as a pressure-sensitive adhesive layer or other attachment layer extending across and contacting the non-woven fibrous web. As another possibility, any of these insulators may include a solid thermal barrier such as an aluminum sheet or foil layer adjacent to the non-woven fibrous web. For some applications, one or more acoustically insulating layers may also be coupled to the non-woven fibrous web.

Figure 5:
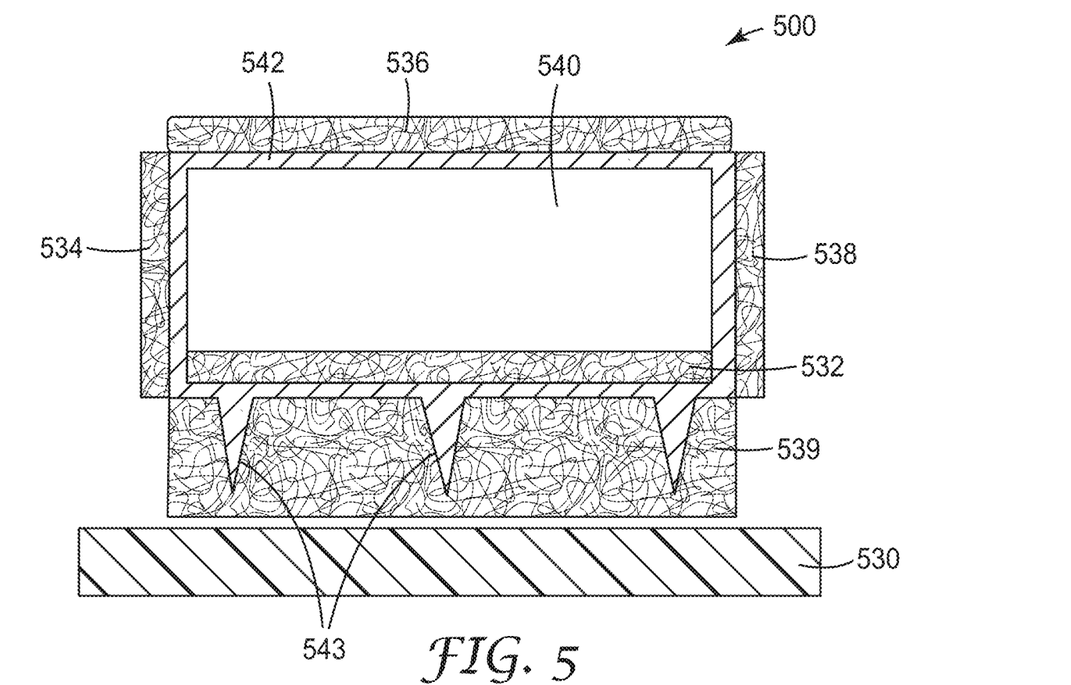
FIG. 5 is a side cross-sectional view of a thermally insulated EV battery assembly.

FIG. 5 is a schematic of a passive thermally insulated assembly 500 housing an EV battery pack for an automotive application. The assembly 500 can be mounted below the car chassis and held by a bottom plate 530, typically made from fiberglass. Centrally located is a battery pack 540, having a bottom surface bounded by a thermal insulator 532 such as described herein. While not depicted here, additional thermal insulators may be disposed along the top or any of the side surfaces of the battery pack 540.

As further shown in FIG. 5, the battery pack 540 and insulator 532 are collectively enclosed in a case 542, which may be made from aluminum or a composite material. Additional thermal insulators 534, 536, 538, 539 are disposed around the case 542 as shown, partially surrounding it to provide further insulation from the external environment. Optionally and as shown, the case 542 has a plurality of protrusions 543 along its bottom surface to accommodate channels for circulating a coolant. In this passive thermal system, the battery pack 540 acts as a heat source to help keep the enclosure within the case 542 within a pre-determined temperature range.

Thermal insulation can be installed using any suitable method. The provided thermal insulators are not only conformable but are capable of being compressed and expanded to fill the cavities, or enclosures, in which they are housed. Enclosures along the outer periphery of the case 542 may be irregularly shaped and/or have significant variations in thickness as shown. Enclosures used in EV applications may, in some instances, have thickness variations in the range of from 10% to 100% relative to the largest thickness dimension of the enclosure. The provided thermal insulators may, in an exemplary installation, be placed in compression within such an enclosure, and then allowed to expand and substantially fill the enclosure.

The resilience of these materials can be characterized based on their dimensional recovery shortly after being compressed. In preferred embodiments, for example, the thickness recovers to at least 70%, 72, 75, 77, 80, 82, 85, 87, 90, 92, or 95% of its original thickness 5 minutes after being compressed to 37% of its original thickness at ambient conditions.

While not intended to be exhaustive, a list of exemplary embodiments is provided as follows:

1. A thermal insulator comprising: a non-woven fibrous web comprising a plurality of fibers, the plurality of fibers comprising: 60-100 wt % of oxidized polyacrylonitrile fibers; and 0-40 wt % of reinforcing fibers having an outer surface comprised of a polymer with a melting temperature of from 100° C. to 300° C., wherein the non-woven fibrous web has an average bulk density of from 15 kg/m$^3$ to 50 kg/m$^3$ and wherein the plurality of fibers are substantially entangled along directions perpendicular to a major surface of the non-woven fibrous web.
2. The thermal insulator of embodiment 1, wherein the non-woven fibrous web contains 3-30 wt % of reinforcing fibers having an outer surface comprised of a polymer with a melting temperature of from 100° C. to 300° C.
3. The thermal insulator of embodiment 2, wherein the non-woven fibrous web contains 3-19 wt % of reinforcing fibers having an outer surface comprised of a polymer with a melting temperature of from 100° C. to 300° C.
4. The thermal insulator any one of embodiments 1-3, wherein the non-woven fibrous web has an average bulk density of from 15 kg/m$^3$ to 40 kg/m$^3$.
5. The thermal insulator of embodiment 4, wherein the non-woven fibrous web has an average bulk density of from 20 kg/m$^3$ to 30 kg/m$^3$.
6. The thermal insulator of any one of embodiments 1-5, wherein the oxidized polyacrylonitrile fibers represent over 85 vol % of the plurality of fibers that are not reinforcing fibers.
7. The thermal insulator of any one of embodiments 1-5, wherein at least some of the oxidized polyacrylonitrile fibers have a crimped configuration.
8. The thermal insulator of any one of embodiments 1-7, wherein the substantially entangled plurality of fibers comprise Needle tacked fibers.
9. The thermal insulator of any one of embodiments 1-8, wherein the non-woven fibrous web has a thickness of from 1 millimeter to 50 millimeters.
10. The thermal insulator of embodiment 9, wherein the non-woven fibrous web has a thickness of from 2 millimeters to 25 millimeters.
11. The thermal insulator of embodiment 10, wherein the non-woven fibrous web has a thickness of from 3 millimeters to 20 millimeters.
12. The thermal insulator of any one of embodiments 1-11, wherein the oxidized polyacrylonitrile fibers have a median fiber diameter of from 1 micrometers to 100 micrometers.
13. The thermal insulator of embodiment 12, wherein the oxidized polyacrylonitrile fibers have a median fiber diameter of from 2 micrometers to 50 micrometers.
14. The thermal insulator of embodiment 13, wherein the oxidized polyacrylonitrile fibers have a median fiber diameter of from 5 micrometers to 20 micrometers.
15. The thermal insulator of any one of embodiments 1-14, wherein the oxidized polyacrylonitrile fibers have a median fiber length of from 10 millimeters to 100 millimeters.
16. The thermal insulator of embodiment 15, wherein the oxidized polyacrylonitrile fibers have a median fiber length of from 15 millimeters to 100 millimeters.
17. The thermal insulator of embodiment 16, wherein the oxidized polyacrylonitrile fibers have a median fiber length of from 25 millimeters to 75 millimeters.
18. The thermal insulator of any one of embodiments 1-17, wherein the weight ratio of oxidized polyacrylonitrile fibers to reinforcing fibers is at least 4:1.
19. The thermal insulator of embodiment 18, wherein the weight ratio of oxidized polyacrylonitrile fibers to reinforcing fibers is at least 5:1.
20. The thermal insulator of embodiment 19, wherein the weight ratio of oxidized polyacrylonitrile fibers to reinforcing fibers is at least 10:1.
21. The thermal insulator of any one of embodiments 1-20, wherein the non-woven fibrous web has a tensile modulus of from 7 kPa to 1400 kPa.
22. The thermal insulator of embodiment 21, wherein the non-woven fibrous web has a tensile modulus of from 70 kPa to 550 kPa.
23. The thermal insulator of embodiment 22, wherein the non-woven fibrous web has a tensile modulus of from 140 kPa to 350 kPa.
24. The thermal insulator of any one of embodiments 1-23, where the non-woven fibrous web has a tensile strength more than 28 kPa.
25. The thermal insulator of any one of embodiments 1-24, wherein the non-woven fibrous web recovers to at least 70% of its original thickness 5 minutes after being compressed to 37% of its original thickness at ambient conditions.
26. The thermal insulator of any one of embodiments 1-25, wherein the non-woven fibrous web has a thermal conductivity coefficient of less than 0.035 W/K–m in its relaxed configuration.
27. The thermal insulator of embodiment 26, wherein the non-woven fibrous web has a thermal conductivity coefficient of less than 0.035 W/K–m when compressed to 20% of its original thickness.
28. A thermally insulated assembly comprising: a heat source; and a thermal insulator of any one of embodiments 1-27 at least partially surrounding the heat source.
29. The assembly of embodiment 28, wherein the heat source comprises an electric vehicle battery.
30. A method of making a thermal insulator comprising: mixing oxidized polyacrylonitrile fibers having crimped configurations with reinforcing fibers having outer surfaces comprised of a polymer with a melting temperature between 100° C. and 300° C.; heating the fiber mixture to a temperature sufficient to melt the outer surfaces of the reinforcing fibers to provide a non-woven fibrous web; and entangling the oxidized polyacrylonitrile fibers and reinforcing fibers with each other along a direction perpendicular to the non-woven fibrous web to provide an average bulk density of from 10 kg/m$^3$ to 35 kg/m$^3$ in the non-woven fibrous web.

31. A method of making a thermal insulator comprising: mixing oxidized polyacrylonitrile fibers with reinforcing fibers having outer surfaces comprised of a polymer with a melting temperature between 100° C. and 300° C. to obtain a non-woven fibrous web, wherein the oxidized polyacrylonitrile fibers represent over 85% by volume of fibers present that are not reinforcing fibers; heating the fiber mixture to a temperature sufficient to melt the outer surfaces of the reinforcing fibers to provide a non-woven fibrous web; and entangling the oxidized polyacrylonitrile fibers and reinforcing fibers with each other along a direction perpendicular to the non-woven fibrous web to provide an average bulk density of from 10 kg/m$^3$ to 35 kg/m$^3$ in the non-woven fibrous web.

32. The method of embodiment 30 or 31, wherein the non-woven fibrous web has an average bulk density of from 15 kg/m$^3$ to 30 kg/m$^3$.

33. The method of embodiment 32, wherein the non-woven fibrous web has an average bulk density of from 20 kg/m$^3$ to 30 kg/m$^3$.

34. The method of any one of embodiments 30-33, further comprising smoothing a major surface of the non-woven fibrous web by calendaring the non-woven fibrous web, heating the non-woven fibrous web, and/or applying tension to the non-woven fibrous web.

35. The method of embodiment 34, further comprising a density gradient at the smoothed surface.

36. The method of any one of embodiments 30-35, further comprising coating the non-woven fibrous web with a coating fluid selected from the group consisting of silicones, acrylates, and fluoropolymers whereby the non-woven fibrous web has an emissivity of less than 0.5.

37. The method of any one of embodiments 30-36, wherein the resulting non-woven fibrous web passes the UL-94V0 flame test.

38. A thermal insulator made by the method of any one of embodiments 30-37.

39. A method of insulating an electric vehicle battery comprising: providing an enclosure adjacent to the electric vehicle battery; placing the thermal insulator of any one of embodiments 1-27 and 38 in compression within the enclosure; and allowing the thermal insulator to expand and substantially fill the enclosure.

40. The method of embodiment 39, wherein the enclosure has thickness variations of 10% to 100%, relative to the largest thickness dimension of the enclosure.

EXAMPLES

Objects and advantages of this disclosure are further illustrated by the following non-limiting examples, but the materials and amounts thereof recited in these examples, as well as other conditions and details, should not be construed to unduly limit this disclosure.

TABLE 1

| Materials | | |
|---|---|---|
| Designation | Description | Source |
| OPAN-1 | Oxidized polyacrylonitrile staple fibers, median length = 50 mm, 1.7 dtex (12 micrometers), crimp level > 7.6 per inch (>3.0 per cm), available under the trade designation "ZOLTEK OX STAPLE FIBERS" | Zoltech, Bridgeton, MO |
| PET-FR | Polyethylene terephthalate (PET) staple fibers with flame retardant agent, available under the trade designation "TREVIRA CS AND FR" | Trevira GmbH, Hattersheim, Germany |
| HT500T2 | Web of polyester fibers including scrim material on both major surfaces, available under the trade designation "3M THINSULATE HIGH TEMPERATURE ACOUSTIC ABSORBER HT500T2" | 3M Co., St. Paul, MN |

Test Methods

Surface base weight measurement: A section of nonwoven web was cut to a 12 inches by 12 inches (30.5 cm by 30.5 cm) square and was weighed. The weight divided by the surface area (0.0929 m$^2$) gave the surface base weight, reported in grams per square meter ("gsm").

Nonwoven web thickness measurement: The method of ASTM D5736-95 was followed, according to test method for thickness of high loft nonwoven fabrics. The plate pressure was calibrated at 0.002 psi (13.790 Pascal).

Average bulk density measurement: The surface base weight was divided by the sample thickness to give the average bulk density, reported in kg/m$^3$.

Absolute thermal conductivity coefficient measurement (thermal conductivity plus convection and radiation): The ASTM D1518-86 standard test method for thermal transmittance of textile materials was followed, using a NETZSCH HFM436 machine. The top and bottom plate temperatures were set at a 20° C. delta (i.e., +10° C. and −10° C. relative to the mean temperature).

Flame test 1: FAR 25-853a and FAR 25-853b vertical burner. Reference to UL94-V0 standard with flame height 20 mm and burn twice at 10 seconds each.

Flame test 2: FAR 25-856a radiant panel test.

Tensile strength measure: Follow ASTM D882-12 standard and used Instron. Samples were cut 1 inch (25.4 mm) wide and 2 inches (50.8 mm) grab distance.

Comparative Example 1 (CE-1)

A sample of HT500T2 had the scrim material removed, by hand, from both major surfaces, to give the web of polyester fibers that was tested as CE-1

Comparative Example 2 (CE-2)

100 wt. % OPAN, Needle tacked. 13 oz per sq yd (or 440 gsm) from SGL Group (Charlotte, N.C.)

Comparative Example 3 (CE-3)

OPAN Supplier name is Zhenjiang Yishengyu Co. Ltd. (镇江市益盛 裕有限公司), this type of OPAN is 2.5 denier and 64 mm length. The binder supplier name is SINOPEC Yizheng Chemical Fiber Co. Ltd. (中石化仪征化纤有限公司), this type of binder is 4080 (standard PET bi-component fiber, Melty fiber). The web was made through a carding process, using 30 wt. % binder and 70 wt. % OPAN fibers.

Comparative Example 4 (CE-4)

About ⅓ of a layer of CE-3 was peeled away, by hand, and used for testing.

Example 1 (EX-1): 90 wt. % OPAN-1+10 wt. % PET-FR, Needle Tacked

A mixture of 90% (by weight) PANOX® A140 1.7 dtex 12 micrometers), 50 mm cut length, staple fibers and 10% (by weight) TREVIRA T270 3.3 dtex (17 micrometers), 60 mm cut length monocomponent FR-modified PET were opened, blended and air-laid at 5.7 ft/min using an 18 inch wide Rando Lab Series Model SB-Feeder/SBD-Webber where the Webber Lickerin was operating at 3000 rpm to form a 150 gsm unbonded web. This unbonded web was conveyed to a Dilo Needle Loom, Model DI-Loom OD-1 6 having a needleboard array of 23 rows of 75 needles/row where the rows are slightly offset to randomize the pattern. The needles are Foster 20 3-22-1.5 B needles. The array is roughly 7 inches deep in the machine direction and nominally 24 inches (61 cm) wide with needle spacings of roughly 0.30 inch (7.6 mm). The needleboard was operated at 91 strokes/minute to entangle and compact the web to a roughly 0.20 inch (5.1 mm) thickness. By needle tacking, physical entanglement was introduced in the direction perpendicular to the web's major surface.

The web was then conveyed into an electric oven (225-230° C.) with a line speed of 1.1 m/min, which melts the TREVIRA T270 3.3 dtex (17 micrometers), 60 mm cut length monocomponent FR-modified PET fibers. In this example, the web was removed immediately after the oven. The oven is an electric oven from International Thermal System, LLC (Milwaukee, Wis.). It has one heating chamber of 5.5 meters in length; the principle is air blowing in the chamber from the top. The circulation can be set so that a part of the blown air can be evacuated (20 to 100% setup) and a part can be re-circulated (20-100% setup). In this example, the air was evacuated at 60% setting and re-circulated at 40%, the temperature was 227° C. in the chamber. The sample was passed twice in the chamber.

Example 1, Compressed (EX-1, Compressed)

The web of EX-1, having initial thickness of 5.1 mm, was squeezed to 1.9 mm thickness for 60 hours, and then was allowed for about 5 minutes to recover to 3.6 mm. After 2 days, the sample recovered to 4.2 mm.

Comparative Example 5 (CE-5): 90 wt. % OPAN+10 wt. % FR Binder, No Needle Tacking A nonwoven fibrous web was produced according to the procedure followed in Example 1, except that the needle tacking step was omitted.

Example 2 (EX-2): 80 wt. % OPAN+20 wt. % FR Binder, Needle Tacked

A nonwoven fibrous web was produced according to the procedure followed in Example 1, except that the weight ratio of OPAN-1 to PET-FR was 80:20.

Example 2, Compressed (EX-2, Compressed)

The web of EX-2, having an initial thickness of 4.4 mm, was squeezed to 1.9 mm thickness for 20 minutes, and then allowed to relax for about 1 minute to 3.6 mm.

Comparative Example 6 (CE-6): 80 wt. % OPAN+20 wt. % FR Binder, No Needle Tacking A nonwoven fibrous web was produced according to the procedure followed in Example 2, except that the needle tacking step was omitted.

Example 3 (EX-3): 80 wt. % OPAN+20 wt. % FR Binder, Needle Tacked, Plus Silicone Coating A nonwoven fibrous web was prepared according to Example 2 (including needle tacking), and was coated with a silicone coating mixture according to Table 2. The silicone coating mixture was applied by placing all the materials of Table 2 in a pan and soaking the nonwoven fibrous web until the nonwoven fibrous web appeared to be completely saturated by the silicone coating mixture. The silicone coating mixture was cured on the nonwoven fibrous web in a convection oven at 105° C. for 4 minutes.

TABLE 2

| Silicone coating mixture | |
|---|---|
| Material | Amount, grams |
| "SYL-OFF SB2792" Coating (from Dow Corning, Midland, MI) | 14.63 |
| "SYL-OFF 7048" Cross-linker (from Dow Corning, Midland, MI) | 0.30 |
| Zn-DBU-AA Catalyst | 0.825 |
| Heptane | 85.4 |

In Table 2, Zn-DBU-AA=Zinc+1,8-diazabicyclo[5.4.0] unde-7-ene+acetic anhydride (similar to those catalysts found in U.S. Pat. No. 9,006,357, the description of which is incorporated herein by reference).

Example 4: 75 wt. % OPAN+25 wt. % Binder, Needle Tacked

A non-woven fibrous web was produced according to the procedure followed in Example 1, except that the weight ratio of OPAN-1 to PET-FR was 75:25.

Example 5: 75 wt. % OPAN+25 wt. % Binder, Needle Tacked, Plus Silicone Coating, Plus Calendering Step to have a Smooth and Densified Surface A nonwoven fibrous web with silicone coating was produced according to Example 3, except that the weight ratio of OPAN-1 to PET-FR was 75:25. The silicone-coated nonwoven fibrous web was then subjected to a calendering procedure to give the coated web with a smooth and densified surface. The web was calendered between two smooth steel rolls, with the top roll set at 219° C. and the bottom roll set at 222'C. Gap between the two rolls was set at 0.030 inch (7.6 mm), with pressure at 500 pounds per lineal inch (89 kg per lineal centimeter). Speed was at 3 ft/min (0.91 meter/min).

Example 6: 70 wt. % OPAN+30 wt. % Binder, Needle Tacked

A mixture of 70% (by weight) PANOX® A140 1.7 dtex (12 micrometers), 50 mm cut length, staple fibers and 30% (by weight) TREVIRA T270 6.7 dtex (25 micrometers), 60 mm cut length monocomponent FR-modified PET were fed into a split pre-opening and blending chamber with two rotating spike rollers with a conveyor belt with a width of 0.6 m at a velocity 0.8 m/min. The fibrous materials were opened and fluffed in the top of the chamber and then fell through the upper rows of spikes rollers to the bottom of the forming chamber passing thereby the lower rows of spike rollers. The materials were pulled down on a porous endless belt/wire by a combination of gravity and vacuum applied to the forming chamber from the lower end of the porous forming belt/wire. A support layer of the type JM 688-80 (Support Layer 1) was fed into the forming chamber on the top surface of the endless forming belt/wire running at the lower end of the forming chamber moving at a speed of 1.1 m/min.

This unbonded web was conveyed to a Dilo Needle Loom, Model DI-Loom OD-1 6 having a needleboard array of 23 rows of 75 needles/row where the rows were slightly offset to randomize the pattern. The needles were 36 gauge 3½" (8.9 cm) conical felting needles from Feltloom. The array was roughly 7 inches (18 cm) deep in the machine direction and nominally 24 inches (61 cm) wide with needle spacings of roughly 0.30 inch (7.6 mm). The needleboard was operated at 225 strokes/minute to entangle and compact the web to a roughly 0.20 inch (5.1 mm) thickness.

The web was then conveyed into an electric oven (225° C. to 230° C.) with a line speed of 1.1 m/min, which melted the TREVIRA 1270 3.3 dtex (17 micrometers), 60 mm cut length monocomponent FR-modified PET fibers. In this example, the web was removed immediately after the oven. The oven was an electric oven from International Thermal System, LLC (Milwaukee, Wis.). It had one heating chamber of 5.5 meters in length; the principle is air blowing in the chamber from the top. The circulation can be set so that a part of the blown air can be evacuated (20 to 100% setup) and a part can be re-circulated (20-100% setup). In this example, the air was evacuated at 60% setting and re-circulated at 40%, the temperature was 227° C. in the chamber. The sample was passed twice in the chamber.

Samples were tested for flame resistance, tensile strength, and thermal conductivity, according to the described test methods, with results as summarized in Tables 3 to 6.

TABLE 3

Flame Test 1 Data

| material | OPAN-1, wt. % | PET-FR, wt. % | Needle tack, strokes/min | Thickness, mm | Surface base weight, gsm | Bulk density, kg/m$^3$ | Flame Test 1 results |
| --- | --- | --- | --- | --- | --- | --- | --- |
| CE-1 | 0 | 100 | 0 | 21 | 500 | 24 | Failed |
| CE-2 | 100 | 0 | ND | 8.1 | 372 | 46 | Passed |
| CE-3 | 70 | 30 | 0 | 10.8 | 281 | 26 | Passed |
| CE-4 | 70 | 30 | 0 | 3.6 | 94 | 26 | Failed |
| EX-1 | 90 | 10 | 91 | 5.1 | 137 | 27 | Passed |
| EX-1, compressed | 90 | 10 | 91 | 3.6 | 137 | 38 | Passed |
| CE-5 | 90 | 10 | 0 | 6.1 | 154 | 25 | Passed |
| EX-2 | 80 | 20 | 91 | 4.4 | 130 | 30 | Passed |
| EX-2, compressed | 80 | 20 | 91 | 3.6 | 130 | 36 | Failed |
| CE-6 | 80 | 20 | 0 | 5.8 | 137 | 24 | Passed |
| EX-3 | 80 | 20 | 91 | 4 | 185 | 46 | Failed |
| EX-4 | 75 | 25 | 91 | 6.1 | 169 | 28 | Passed |
| EX-5 | 75 | 25 | 91 | 9.9 | 234 | 24 | Passed |
| EX-6 | 70 | 30 | 225 | 6.0 | 280 | 47 | Passed |

In Table 3, "ND" = not determined; the as-received CE-2 material was already Needle tacked.

TABLE 4

Flame Test 2 Data for CE-3 and EX-1

| Sample | OPAN, wt % | Binder, wt % | Needle tack, strokes/min | thickness, mm | Surface base weight, gsm | FAR 25-856a test results and description |
| --- | --- | --- | --- | --- | --- | --- |
| CE-3 | 70 | 30 | 0 | 10.8 | 281 | The binders vaporized out when the sample were placed into the 520° F. (271° C.) chamber. When nozzle down, saw flame propagation until all binders burnt out. Sample thickness doubled after burn. |

TABLE 4-continued

Flame Test 2 Data for CE-3 and EX-1

| Sample | OPAN, wt % | Binder, wt % | Needle tack, strokes/min | thickness, mm | Surface base weight, gsm | FAR 25-856a test results and description |
|---|---|---|---|---|---|---|
| EX-1 | 90 | 10 | 10 | 5.1 | 137 | The binders vaporized out when the sample were placed into the 520° F. (271° C.) chamber. When nozzle down, saw flame propagation, all binder burnt out within 10 seconds. Sample was still intact after the burn. The thickness was measured to be 5.3 mm after the burn |

TABLE 5

Tensile Strength Data

| Sample | Weight, grams | Thickness, mm | Surface base weight, gsm | Bulk density, kg/m$^3$ | Peak Stress, psi (kPa) | Modulus, psi (kPa) |
|---|---|---|---|---|---|---|
| CE-2 | 34.55 | 8.1 | 371.8931 | 46 | 40.83 (281.5) | 75.2 (518) |
| CE-3 | 26.06 | 10.8 | 280.5075 | 26 | 3.69 (25.4) | 29.32 (202.2) |
| EX-1 | 12.72 | 5.1 | 136.9169 | 27 | 6.16 (42.5) | 46.99 (324.0) |
| CE-5 | 14.32 | 6.1 | 154.1392 | 25 | 5.42 (37.4) | 45.81 (315.8) |
| EX-2 | 12.12 | 4.4 | 130.4586 | 30 | 15.3 (105) | 126.3 (870.8) |
| CE-6 | 12.74 | 5.8 | 137.1322 | 24 | 8.8 (61) | 73.83 (506.0) |

TABLE 6

Thermal Conductivity Data

| Sample | Thickness, mm | Surface base weight, gsm | bulk density, kg/m$^3$ | k (W/K − m) @ 10° C. | k (W/K − m) @ 20° C. | k (W/K − m) @ 30° C. | k (W/K − m) @ 40° C. | k (W/K − m) @ 50° C. | k (W/K − m) @ 60° C. |
|---|---|---|---|---|---|---|---|---|---|
| CE-1 | 23.2 | 490 | 21.1 | 0.035375 | 0.037554 | 0.038651 | 0.040712 | 0.041839 | 0.043876 |
| HT500T2 | 25.1 | 684 | 27.2 | 0.035701 | 0.037965 | 0.039143 | 0.041131 | 0.042257 | ND |
| CE-2 | 8.1 | 372 | 45.6 | 0.032073 | 0.033576 | 0.034732 | 0.036124 | ND | ND |
| CE-3 | 10.8 | 281 | 25.7 | 0.029218 | 0.030184 | 0.031812 | 0.032961 | 0.034561 | 0.035636 |
| EX-1 | 5.1 | 137 | 26.9 | 0.02647 | 0.027664 | 0.028918 | 0.030386 | 0.031792 | 0.033133 |
| EX-1, compressed | 2.261 | 137 | 64.7 | 0.023076 | 0.024183 | 0.025546 | 0.027128 | 0.028739 | 0.030212 |
| EX-2 | 4.9 | 106 | 21.7 | 0.02667 | 0.028029 | 0.029251 | 0.030634 | 0.032187 | 0.03365 |
| EX-5 | 9.9 | 234 | 23.6 | 0.031118 | 0.032504 | 0.034121 | 0.035475 | ND | ND |

In Table 5, "ND" = not determined

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given to enable one of ordinary skill in the art to practice the claimed disclosure, is not to be construed as limiting the scope of the disclosure, which is defined by the claims and all equivalents thereto.

What is claimed is:

1. A thermally-insulated assembly for an electric vehicle battery comprising:
   a battery case for the electric vehicle battery, the battery case made from an aluminum or composite material;
   one or more thermal insulators at least partially surrounding the battery case, each of the one or more thermal insulators comprising:
      a non-woven fibrous web comprising a plurality of fibers, the plurality of fibers comprising:
         81-100 wt % of oxidized polyacrylonitrile fibers, wherein the oxidized polyacrylonitrile fibers have crimped configurations; and
         3-19 wt % of reinforcing fibers having an outer surface comprised of a polymer with a melting temperature of from 100° C. to 300° C., the reinforcing fibers being polyethylene terephthalate fibers containing a flame retardant agent,
      wherein the non-woven fibrous web has an average bulk density of from 15 kg/m$^3$ to 50 kg/m$^3$, wherein the plurality of fibers are substantially entangled along directions perpendicular to a major surface of the non-woven fibrous web, and further wherein the reinforcing fibers are at least partially melted to produce a three-dimensional array of nodes whereby the oxidized polyacrylonitrile fibers and the reinforcing fibers are physically attached to each other.

2. The thermally-insulated assembly of claim 1, wherein the oxidized polyacrylonitrile fibers represent over 85 vol % of the plurality of fibers that are not reinforcing fibers.

3. The thermally-insulated assembly of claim 1, wherein the substantially entangled plurality of fibers comprise needle-tacked fibers.

4. The thermally-insulated assembly of claim 1, wherein the oxidized polyacrylonitrile fibers have a median fiber diameter of from 1 micrometers to 100 micrometers.

5. The thermally-insulated assembly of claim 4, wherein the oxidized polyacrylonitrile fibers have a median fiber diameter of from 5 micrometers to 20 micrometers and a median fiber length of from 25 millimeters to 75 millimeters.

6. The thermally-insulated assembly of claim 1, wherein the non-woven fibrous web recovers to at least 70% of its original thickness 5 minutes after being compressed to 37% of its original thickness at ambient conditions.

7. The thermally-insulated assembly of claim 1, wherein the non-woven fibrous web is coated with a coating fluid comprised of a silicone, acrylate, or fluoropolymer, and further wherein the non-woven fibrous web has an emissivity of less than 0.5.

8. The thermally-insulated assembly of claim 1, further comprising an electric vehicle battery pack enclosed within the battery case.

9. The thermally-insulated assembly of claim 8, wherein the one or more thermal insulators further comprises one or more thermal insulators disposed between the electric vehicle battery pack and the battery case.

10. The thermally-insulated assembly of claim 1, wherein the one or more thermal insulators further comprises a solid thermal barrier adjacent to the non-woven fibrous web.

11. The thermally-insulated assembly of claim 10, wherein the solid thermal barrier comprises an aluminum sheet or foil layer.

12. The thermally-insulated assembly of claim 1, wherein the battery case comprises one or more protrusions along its exterior surface to provide channels for circulating a coolant.

13. The thermally-insulated assembly of claim 12, further comprising a coolant received in the channels.

14. The thermally-insulated assembly of claim 1, wherein the non-woven fibrous web has a thermal conductivity coefficient of less than 0.035 W/K–m when compressed to 20% of its original thickness.

15. The thermally-insulated assembly of claim 1, wherein the non-woven fibrous web has a weight ratio of oxidized polyacrylonitrile fibers to reinforcing fibers of at least 5:1.

16. The thermally-insulated assembly of claim 15, wherein the non-woven fibrous web has a weight ratio of oxidized polyacrylonitrile fibers to reinforcing fibers of at least 10:1.

* * * * *